United States Patent
Chu et al.

(10) Patent No.: US 7,392,372 B2
(45) Date of Patent: Jun. 24, 2008

(54) METHOD FOR MEMORY INITIALIZATION INVOLVES DETECTING PRIMARY QUANTITY OF MEMORIES AND SETTING OPTIMUM PARAMETERS BASED ON HARDWARE INFORMATION OF MEMORIES

(75) Inventors: Hsiu-Ming Chu, Taipei (TW); Kuan-Jui Ho, Taipei (TW); Chung-Che Wu, Taipei (TW)

(73) Assignee: Via Technologies, Inc., Hsin-Tien (TW)

( * ) Notice: Subject to any disclaimer, the term of this patent is extended or adjusted under 35 U.S.C. 154(b) by 368 days.

(21) Appl. No.: 11/001,148

(22) Filed: Nov. 30, 2004

(65) Prior Publication Data

US 2006/0053273 A1 Mar. 9, 2006

(30) Foreign Application Priority Data

Sep. 8, 2004 (TW) ............... 93127104 A

(51) Int. Cl.
*G06F 9/00* (2006.01)
(52) U.S. Cl. ............................... 713/1; 713/600
(58) Field of Classification Search .................. 713/1–2
See application file for complete search history.

(56) References Cited

U.S. PATENT DOCUMENTS

| | | | | |
|---|---|---|---|---|
| 5,509,138 A * | 4/1996 | Cash et al. | ................. | 711/170 |
| 6,092,146 A * | 7/2000 | Dell et al. | ................. | 711/5 |
| 6,334,174 B1 * | 12/2001 | Delp et al. | ................. | 711/167 |
| 6,370,612 B2 * | 4/2002 | Feierbach | ................. | 711/106 |
| 6,397,277 B1 * | 5/2002 | Kato et al. | ................. | 710/104 |
| 6,530,001 B1 * | 3/2003 | Lee | ................. | 711/154 |
| 6,990,572 B2 * | 1/2006 | Ando | ................. | 713/1 |
| 7,096,349 B1 * | 8/2006 | Hamilton | ................. | 713/1 |
| 2001/0003198 A1 * | 6/2001 | Wu | ................. | 711/104 |
| 2002/0144173 A1 | 10/2002 | Jeddeloh | ................. | 713/501 |
| 2003/0110368 A1 * | 6/2003 | Kartoz | ................. | 713/1 |
| 2004/0064686 A1 * | 4/2004 | Miller et al. | ................. | 713/1 |
| 2005/0060600 A1 * | 3/2005 | Jeddeloh | ................. | 714/5 |

* cited by examiner

*Primary Examiner*—Chun Cao
(74) *Attorney, Agent, or Firm*—Thomas, Kayden, Horstemeyer & Risley

(57) ABSTRACT

A memory initialization method for a plurality of memories. The memories are initialized according to predetermined initial parameters. A first quantity of the memories is detected. Optimum parameters are set according hardware information of the memories. The memories are re-initialized according to the optimum parameters. A second quantity of the memories is detected. The parameters for memory initialization are adjusted when the first quantity and the second quantity are different.

12 Claims, 2 Drawing Sheets

METHOD FOR MEMORY INITIALIZATION INVOLVES DETECTING PRIMARY QUANTITY OF MEMORIES AND SETTING OPTIMUM PARAMETERS BASED ON HARDWARE INFORMATION OF MEMORIES

BACKGROUND

The present disclosure relates in general to methods for memory initialization, and in particular to methods for initializing memories with different hardware information.

Computers generally comprise a CPU, chipsets, a memory controller and buses. CPU processes most operations of the computer. Chipsets support the operation of the CPU. Generally, the chipset comprises controllers for transmission of data between the CPU and other devices. The memory controller is a part of the chipset, establishing data transmission between memory and the CPU. Buses connect the CPU, memory, and other I/O devices. The bus determines the operating speed of a main board. In response to different data transmission requirements, different kinds of buses are provided. A memory bus connects the memory controller and the memory module.

During boot, memory initialization comprises setting memory operating frequency and column address strobe latency (CL). When a plurality of memories are connected to the memory controller, integration for memory operating frequencies and CLs of memories is required, especially when hardware information of the memories is different.

When memory initialization is correct, all memories operate successfully. Conversely, when memory initialization fails, system operation is unstable or cannot complete boot operation, and erroneous initialized memories are undetected.

Conventional technology obtains memory initialization parameters by reading serial presence detect (SPD) codes stored in EEPROM of the memory. Thereby, information required for memory initialization is obtained.

Using two double data rate-synchronous DRAMs (DDR) controlled by the memory controller as an example, the operating frequency of the first DDR can be 400 MHz, 333 MHz and 266 MHz, and its CL can be 3 clocks, 2.5 clocks and 2 clocks, and the operating frequency of the second DDR can be 400 MHz, and its CL can be 2.5 clocks. BIOS can initialize the DDRs operating at 333 MHz and 2.5 CL according to SPD. Thus, memory capacity and efficiency are optimized.

Conventional technology fails to optimize all memories when no operating frequency or CL is indicated by SPDs applied to all memories. In addition, since memory optimization is performed according to the SPD of memory, memory optimization fails when SPD does not correspond to real memory information.

SUMMARY

Methods for memory initialization are provided. An embodiment of a method for memory initialization comprises initializing memories according to predetermined initial parameters, detecting a first quantity of the memories; setting optimum parameters according hardware information of the memories, re-initializing the memories according to the optimum parameters, detecting a second quantity of the memories, and adjusting the parameters for memory initialization when the first quantity and the second quantity are different.

DESCRIPTION OF THE DRAWINGS

The invention will be more fully understood from the detailed description, given hereinbelow, and the accompanying drawings. The drawings and description are provided for purposes of illustration only and, thus, are not intended to limit the invention.

DETAILED DESCRIPTION

Figure 1:
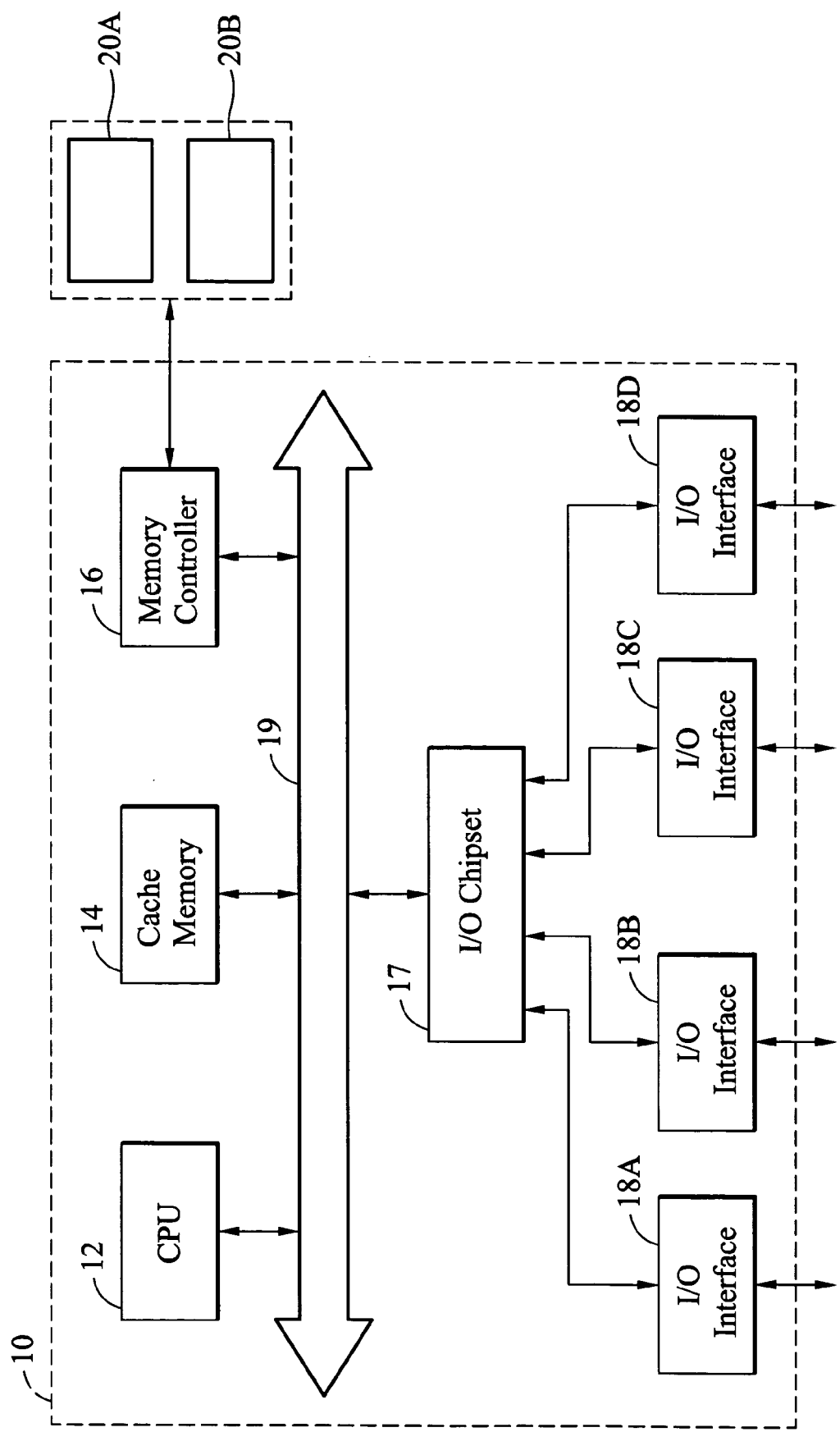
FIG. 1 is a schematic diagram of an embodiment of a computer.

FIG. 1 is a schematic diagram of an embodiment of a computer 10 comprising CPU 12, cache memory 14, memory controller 16, I/O chipset 17 and I/O interface (18A~18D) Computer 10 further comprises buses 19 connecting the devices thereof. Memory 20A and 20B may be respectively installed in four dual in-line memory modules (DIMM).

During boot, memory initialization is performed, comprising setting memory operating frequency and a column address strobe latency (CL). When a plurality of memories are connected to the memory controller, integration for memory operating frequencies and CLs of memories are required.

Figure 2:
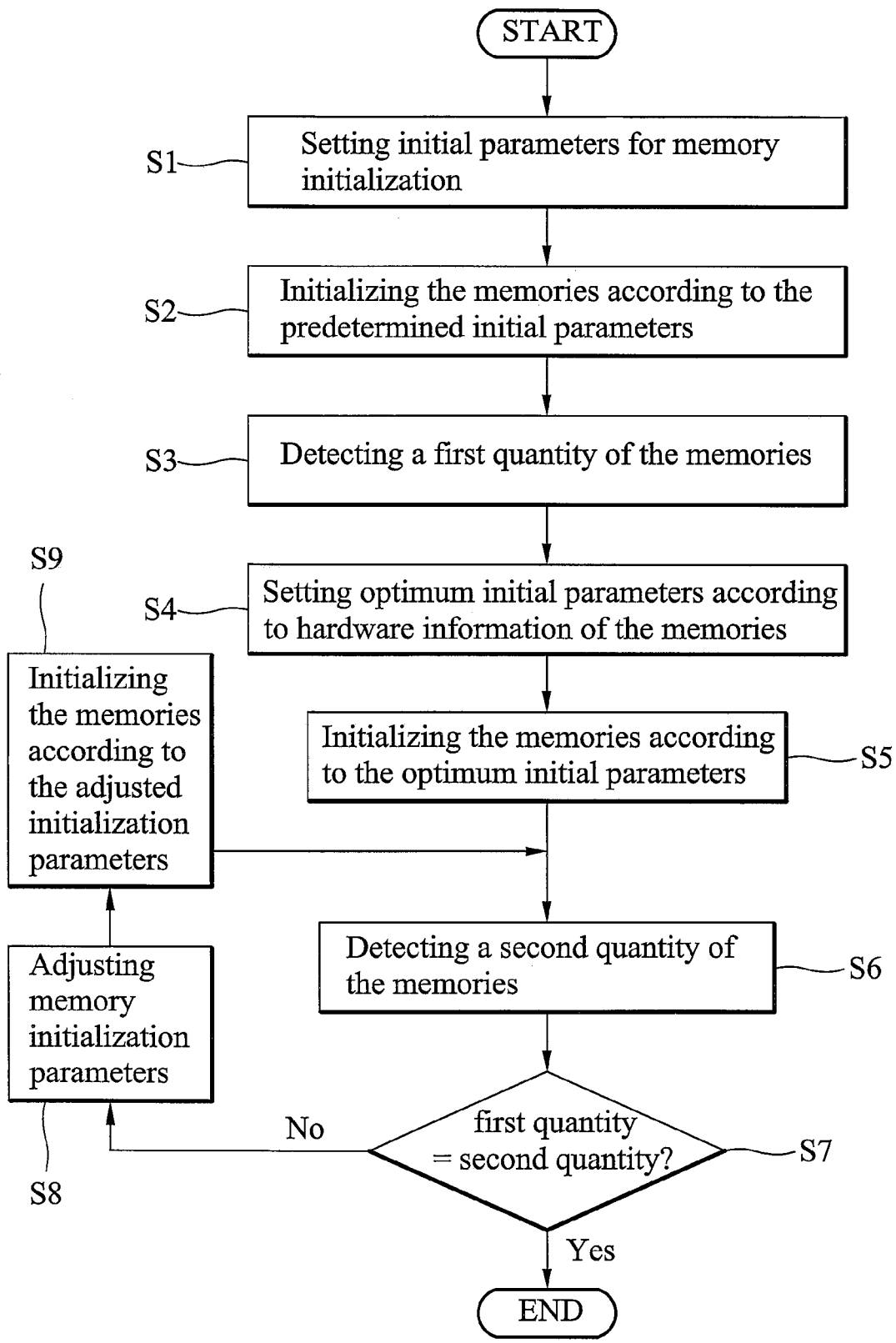
FIG. 2 is a flowchart of an embodiment of a method for DRAM initialization.

FIG. 2 is a flowchart of an embodiment of a method for DRAM initialization. Memories may have different hardware information, comprising memory operating frequencies and CLs. The hardware information of memory may be obtained by reading SPD, or their available parameters. Using two DDR as an example, the memories can be SDRAMs, EDO DRAMs or RDRAMs, or be of different types with similar operating schemes.

During boot, predetermined initial parameters are set for memory initialization (S1), for example, according to a standard lowest memory operating frequency or a standard longest CL. For example, general memory supports 200 MHz of operating frequency and 2.5 clocks of CL. Thus, a qualified memory must be successfully initialized by the predetermined initial parameters.

Memories are initialized according to the predetermined initial parameters (S2). The initialization of memory comprises at setting least the operating frequency and CL of the memories.

Next, a first quantity of the memories is detected (S3). The first quantity of the memory represents total memories because the predetermined initial parameters may successfully initialize all qualified memory. The quantity of the memory can be detected by accessing the memories and reading the signals output therefrom.

Optimum initial parameters are set according to hardware information of the memories for memory initialization (S4). Hardware information of memories is obtained by reading serial presence detect (SPD) codes stored in EEPROM of the memories. The optimum initial parameters can be set according to an ideal highest memory operating frequency or an ideal shortest CL supported for both memories. For example, the operating frequency of the first memory can be 400 MHz, 333 MHz or 266 MHz, and its CL 3 clocks, 2.5 clocks or 2 clocks, and operating frequency of the second memory 400 MHz and 333 MHz, and its CL 2.5 clocks. BIOS obtains the parameters for initialization of both memories according to their SPD codes, operating at frequency of 333 MHz or 400 MHz and 2.5 CL, and selects operating frequency of 400 MHz and 2.5 CL for both memories. Thus, memory capacity and efficiency are optimized. Optimum initial parameters can be designed by hardware characteristic or experience without reading SPD.

Memories are initialized according to the optimum memory initialization parameters (S5). Step S5 is similar to step S2 except for the parameters for memory initialization. Next, a second quantity of the memories is detected (S6) by, for example, accessing the memories and reading the signals output from the memories.

The first quantity and the second quantity are compared (S7). The second quantity equals the first quantity when all the memories are initialized successfully, representing optimum memory initialization parameters are available for all memories. Thus, memory initialization is completed.

If the first quantity exceeds the second quantity, at least one memory cannot be detected because the optimum memory initialization parameters cannot support the memory. Thus, memory initialization parameters are adjusted (S8). The adjusted parameters initialize memories operating in performance between using the predetermined initial parameters and the optimum memory initialization parameters. For example, if memories are initialized operating in the frequency between the standard lowest memory operating frequency and the ideal highest memory operating frequency, or between the standard longest CL and the ideal shortest CL, the memories operate at a decreased operating frequency and an increased CL. It is noted that the initialization parameters can be adjusted according to SPD or assigned by system.

Memories are initialized according to the adjusted initialization parameters (S9), and the process returns to step S6. Steps S6-S9 are repeated until the second quantity equals the first quantity. Memory can be initialized accordingly when the initialization parameters are adjusted to the predetermined initial parameters.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory initialization method for a plurality of memories, comprising:
    initializing the memories according to predetermined initial parameters;
    detecting a first quantity of the memories;
    setting optimum parameters according to hardware information of the memories;
    initializing the memories according to the optimum parameters;
    detecting a second quantity of the memories;
    comparing the first quantity and the second quantity; and
    adjusting the parameters to other parameters between the predetermined initial parameters and the optimum parameters for memory initialization when the first quantity and the second quantity are different, while the memory initialization is completed by the optimum parameters when the first quantity and the second quantity are equal.

2. The memory initialization method as claimed in claim 1, wherein the memory initialization comprises at least setting operating frequency and column address strobe latency of the memory.

3. The memory initialization method as claimed in claim 2, wherein the predetermined initial parameters are set according to a standard lowest memory operating frequency or a standard longest column address strobe latency of the memories.

4. The memory initialization method as claimed in claim 3, wherein the optimum initial parameters are set according to an ideal highest memory operating frequency or an ideal shortest column address strobe latency of the memories.

5. The memory initialization method as claimed in claim 4, wherein the memories are initialized operating in the frequency between the standard lowest memory operating frequency and the ideal highest memory operating frequency, or between the standard longest column address strobe latency and the ideal highest memory operating frequency when the first quantity exceeds the second quantity.

6. The memory initialization method as claimed in claim 5, further comprising:
    detecting a third quantity of the memories after adjusting the parameters for memory initialization; and
    decreasing the operating frequency of the memories or increasing the column address strobe latency of the memories when the first quantity exceeds the third quantity.

7. The memory initialization method as claimed in claim 6, wherein the memories are initialized according to the standard lowest memory operating frequency when the operating frequency of the memories is decreased to the standard lowest memory operating frequency.

8. The memory initialization method as claimed in claim 6, wherein the memories are initialized according to the standard longest column address strobe latency when the column address strobe latency of the memories is increased to the standard longest column address strobe latency.

9. The memory initialization method as claimed in claim 1, wherein the memory information is obtained by detecting serial presence detect codes thereof.

10. The memory initialization method as claimed in claim 9, wherein the optimum initial parameters are set according to serial presence detect codes of the memories.

11. The memory initialization method as claimed in claim 1, wherein the memories have different hardware information.

12. The memory initialization method as claimed in claim 11, wherein the hardware information comprises a plurality of available operating frequencies and column address strobe latencies of the memory.

* * * * *